United States Patent
Ahmed et al.

(10) Patent No.: US 12,007,934 B1
(45) Date of Patent: Jun. 11, 2024

(54) CORRUPT PACKET DETECTOR FOR C-PHY RECEIVER

(71) Applicant: QUALCOMM Incorporated, San Diego, CA (US)

(72) Inventors: Yasser Ahmed, San Diego, CA (US); Sachin Ajit Devamare, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 34 days.

(21) Appl. No.: 18/096,093

(22) Filed: Jan. 12, 2023

(51) Int. Cl.
*G06F 13/42* (2006.01)
*G06F 13/40* (2006.01)

(52) U.S. Cl.
CPC ........ *G06F 13/4291* (2013.01); *G06F 13/405* (2013.01)

(58) Field of Classification Search
CPC ............... G06F 13/405; G06F 13/4291; G06F 11/1625; G06F 11/0772
See application file for complete search history.

(56) References Cited

U.S. PATENT DOCUMENTS

| | | | | |
|---|---|---|---|---|
| 6,721,378 B1 * | 4/2004 | Happonen | ............ | H04L 7/0337 |
| | | | | 375/357 |
| 2005/0160328 A1 * | 7/2005 | Lesartre | ................. | H04L 1/245 |
| | | | | 714/48 |
| 2017/0117979 A1 * | 4/2017 | Sengoku | ............... | H04J 3/0605 |
| 2021/0126819 A1 * | 4/2021 | Lee | ....................... | H04L 25/493 |
| 2021/0409510 A1 * | 12/2021 | Zerna | ...................... | H04L 67/60 |
| 2022/0091952 A1 * | 3/2022 | Pitigoi-Aron | ....... | G06F 11/0772 |
| 2023/0087897 A1 * | 3/2023 | Chou | ..................... | H03F 3/193 |
| | | | | 375/257 |

* cited by examiner

*Primary Examiner* — Phong H Dang
(74) *Attorney, Agent, or Firm* — Loza & Loza, LLP/Qualcomm

(57) ABSTRACT

A communication interface circuit has a deserializer configured to convert a serial stream of 3-bit symbols received from a three-wire serial bus to a parallel multi-symbol word comprising a plurality of symbols ordered in accordance with time of arrival at an input of the deserializer, detection circuits configured to determine whether a pattern of symbols in the parallel multi-symbol word indicates a corrupt data packet, and a finite state machine configured to activate one or more flags responsive to feedback received from the detection circuits. each flag can be configured to cause termination of reception of the corrupt data packet when the each flag is active.

30 Claims, 11 Drawing Sheets

CORRUPT PACKET DETECTOR FOR C-PHY RECEIVER

TECHNICAL FIELD

The present disclosure relates generally to serial communication over a serial bus in a wireless communication device and, more particularly, to detection of errors in control signaling in a C-PHY interface.

BACKGROUND

Mobile communication devices typically include a variety of components such as circuit boards, integrated circuit (IC) devices, application-specific integrated circuit (ASIC) devices and/or System-on-Chip (SoC) devices. The types of components may include processing circuits, user interface components, storage and other peripheral components that communicate over a serial bus. The serial bus may be operated in accordance with a standardized or proprietary protocol. In one example, the serial bus can be operated in accordance with an Inter-Integrated Circuit (I2C or I2C) communication protocol. The I2C bus is configured as a multi-drop bus and was developed to connect low-speed peripherals to a processor. The two wires of an I2C bus include a Serial Data Line (SDA) that carries a data signal, and a Serial Clock Line (SCL) that carries a clock signal.

Multiple standards are defined for interconnecting certain types of components in mobile communication devices. For example, different types of interfaces may be used for communication between an application processor and display or camera components in a mobile communication device. Some display or camera components employ an interface that conforms to standards or protocols specified by the Mobile Industry Processor Interface (MIPI) Alliance for a camera serial interface (CSI) and a display serial interface (DSI).

The MIPI Alliance DSI, DSI-2 (referred to individually or collectively herein as DSI) and CSI and CSI-2 (referred to individually or collectively herein as CSI) standards define wired interfaces that can be deployed within an IC or between some combination of IC devices and SoC devices. CSI protocols may be used to couple a camera and application processor. DSI protocols may be used to couple an application processor and display subsystem. The low-level physical-layer (PHY) interface in each of these applications can be implemented in accordance with MIPI Alliance C-PHY or D-PHY standards and protocols. High-speed modes and low-power modes of communication are defined for C-PHY and D-PHY interfaces. The C-PHY high-speed mode uses a low-voltage multiphase signal transmitted in different phases on a 3-wire link. The D-PHY high-speed mode uses multiple 2-wire lanes to carry low-voltage differential signals. The low-power modes of C-PHY and D-PHY interfaces provide lower rates than the high-speed modes and transmit signals at higher voltages.

As device technology improves, a combination of demand for higher data rates over serial buses have been met in some instances by increasing the clock rates used to control signaling over serial interfaces. For example, the version 2.0 specification for MIPI C-PHY interfaces provides for transmission clock rates of between 4.5 GHz and 6.0 GHz. Increasing transmission clock frequencies can decrease the tolerances and margins defined for data signals. Data packets and control sequences transmitted during C-PHY transactions may be more easily corrupted when transmission clock rates and a failure to detect or respond to such corruptions may result in loss of data throughput over the C-PHY interface. For these and other reasons, there is an ongoing need to improve error detection in C-PHY interfaces.

SUMMARY

Certain aspects of the disclosure relate to systems, apparatus, methods and techniques that enable mobile communication devices and other portable devices to detect and ignore corrupted data packets transmitted over a C-PHY three-wire communication link, including when the corruption is caused by loss of signal integrity or receiver tuning issues. In various aspects of the disclosure, a communication interface circuit, includes a deserializer configured to convert a serial stream of 3-bit symbols received from a three-wire serial bus to a parallel multi-symbol word that includes a plurality of symbols ordered in accordance with time of arrival at an input of the deserializer; detection circuits configured to determine whether a pattern of symbols in the parallel multi-symbol word indicates a corrupt data packet; and a finite state machine configured to activate one or more flags responsive to feedback received from the detection circuits. Each flag is configured to cause termination of reception of the corrupt data packet when the each flag is active.

In various aspects of the disclosure, a method for operating a communication interface circuit, includes converting a serial stream of 3-bit symbols received from a three-wire serial bus to a parallel multi-symbol word that includes a plurality of symbols ordered in accordance with time of arrival at an input of a deserializer; using detection circuits to determine whether a pattern of symbols in the parallel multi-symbol word indicates a corrupt data packet; and activating one or more flags responsive to feedback received from the detection circuits. Each flag is configured to cause termination of reception of the corrupt data packet when the each flag is active.

In various aspects of the disclosure, an apparatus includes means for converting a serial stream of 3-bit symbols received from a three-wire serial bus to a parallel multi-symbol word that includes a plurality of symbols ordered in accordance with time of arrival at an input of a deserializer; means for pattern matching configured to determine whether a pattern of symbols in the parallel multi-symbol word indicates a corrupt data packet; and means for activating one or more flags responsive to feedback received from the detection circuits. Each flag is configured to cause termination of reception of the corrupt data packet when the each flag is active.

In various aspects of the disclosure, a processor-readable storage medium includes code configured to cause a processing circuit to: convert a serial stream of 3-bit symbols received from a three-wire serial bus to a parallel multi-symbol word that includes a plurality of symbols ordered in accordance with time of arrival at an input of a deserializer; use detection circuits to determine whether a pattern of symbols in the parallel multi-symbol word indicates a corrupt data packet; and activate one or more flags responsive to feedback received from the detection circuits. Each flag is configured to cause termination of reception of the corrupt data packet when the each flag is active.

In certain aspects, the detection circuits include a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol. The parallel multi-symbol word includes 14 symbols. The three-wire serial bus may be operated in accordance with a MIPI Alliance C-PHY protocol In certain aspects, each detection circuit is activated after a start-of-transmission (SoT) sequence is detected on the three-wire serial bus. The detection circuits may include a preamble detector configured to assert a missing preamble flag when a preamble has not been detected within a first sampling window that begins after detection of the SoT sequence. The detection circuits may include synchronization (Sync) detector configured to assert a missing Sync flag when a synchronization sequence has not been detected within a second sampling window that begins after detection of the SoT sequence. The detection circuits may include an end-of-transmission (EoT) detector configured to assert a missing EoT flag when an EoT sequence has not been detected on the three-wire serial bus before a next SoT sequence is detected on the three-wire serial bus.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Data communication links employed by SoCs and other IC devices to connect processors with modems and other peripherals may be operated in accordance with industry or proprietary standards or protocols associated with certain functions or types of devices. In the example of display panels, display subsystems, and display drivers, communication standards and protocols defined by the MIPI Alliance are frequently used. The Display Serial Interface (DSI®), for example, provides C-PHY and D-PHY standards and protocols used to define, configure and control a high-speed serial interface between a host processor and a display module.

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

Figure 1:
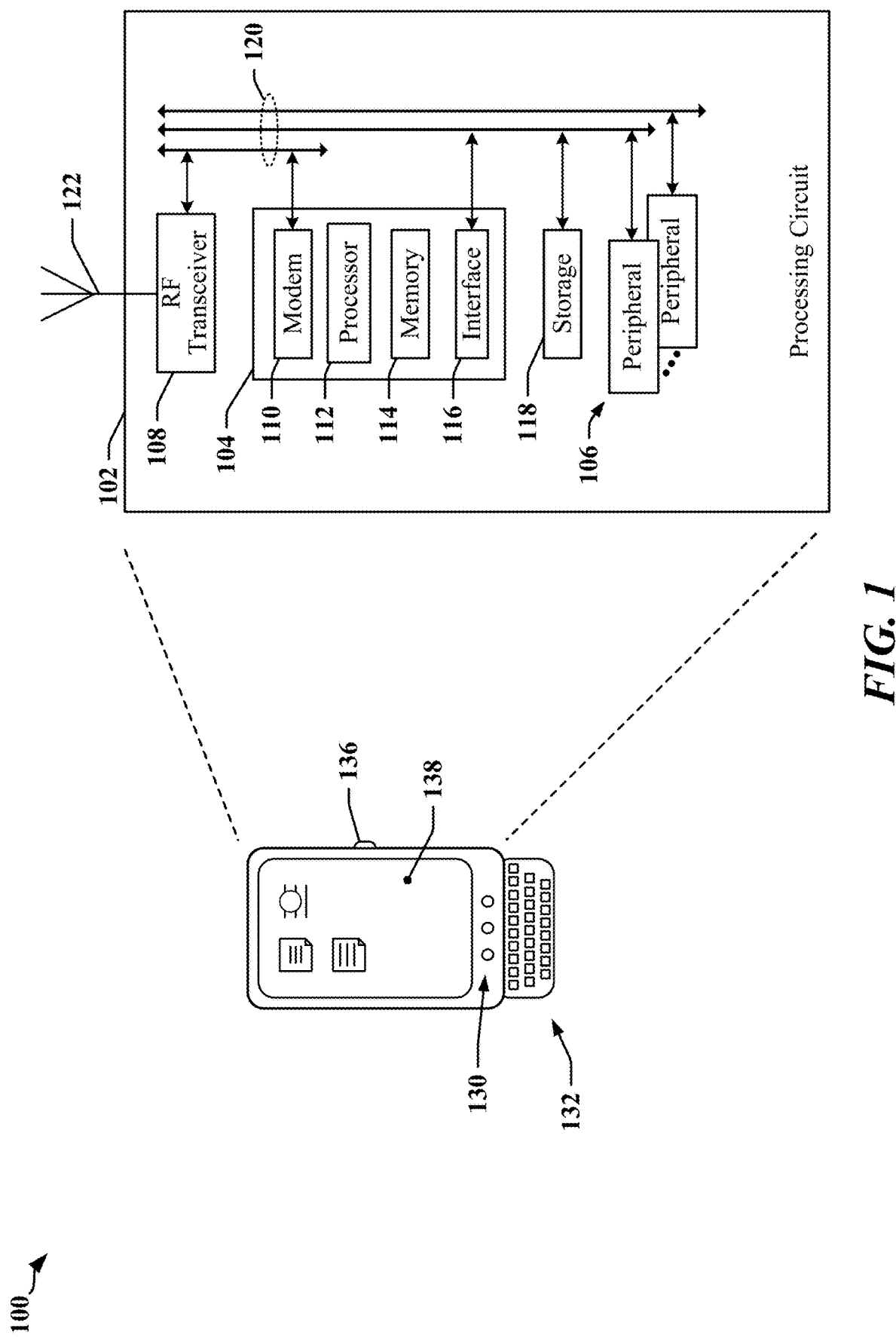
FIG. 1 illustrates an apparatus employing a data link between IC devices and that is selectively operated according to a standard or proprietary protocol.

FIG. 1 illustrates an example of an apparatus 100 that includes multiple devices or circuits coupled through one or more data communication buses. A processing circuit 102 of the apparatus 100 includes multiple circuits or devices 104, 106 and/or 108. In some examples, the processing circuit 102 is implemented using one or more ASICs. In other examples, the processing circuit 102 is implemented in an SoC. In one example, the apparatus 100 may be configured to operate as a communication device and the processing circuit 102 includes an ASIC 104, one or more peripheral devices 106, and a transceiver 108 that cooperate to enable the apparatus to communicate through an antenna 122 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 118 provided on the processing circuit 102. The software modules may include instructions and data stored in the on-board memory 114 or processor-readable storage 118. The ASIC 104 may access its on-board memory 114, the processor-readable storage 118, and/or storage external to the processing circuit 102. The on-board memory 114, the processor-readable storage 118 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 122, a display 138, operator controls, such as switches or buttons 136, 130 and/or an integrated or external keypad 132, among other components. A user interface module may be configured to operate with the display 138, external keypad 132, etc. through a dedicated communication link or through one or more serial data interconnects.

The processing circuit 102 may provide multiple buses 120 that enable communication between two or more devices 104, 106, and/or 108. In one example, the ASIC 104 may include bus interface circuits 116 coupled to one or more of the buses 120. Each of the bus interface circuits 116 may include a combination of circuits, counters, timers, control logic and other configurable circuits or modules. In one example, certain bus interface circuits 116 may be configured to operate in accordance with standards-defined communication specifications or protocols. The processing circuit 102 may include or control a power management function that configures and manages the operation of the apparatus 100.

Figure 2:
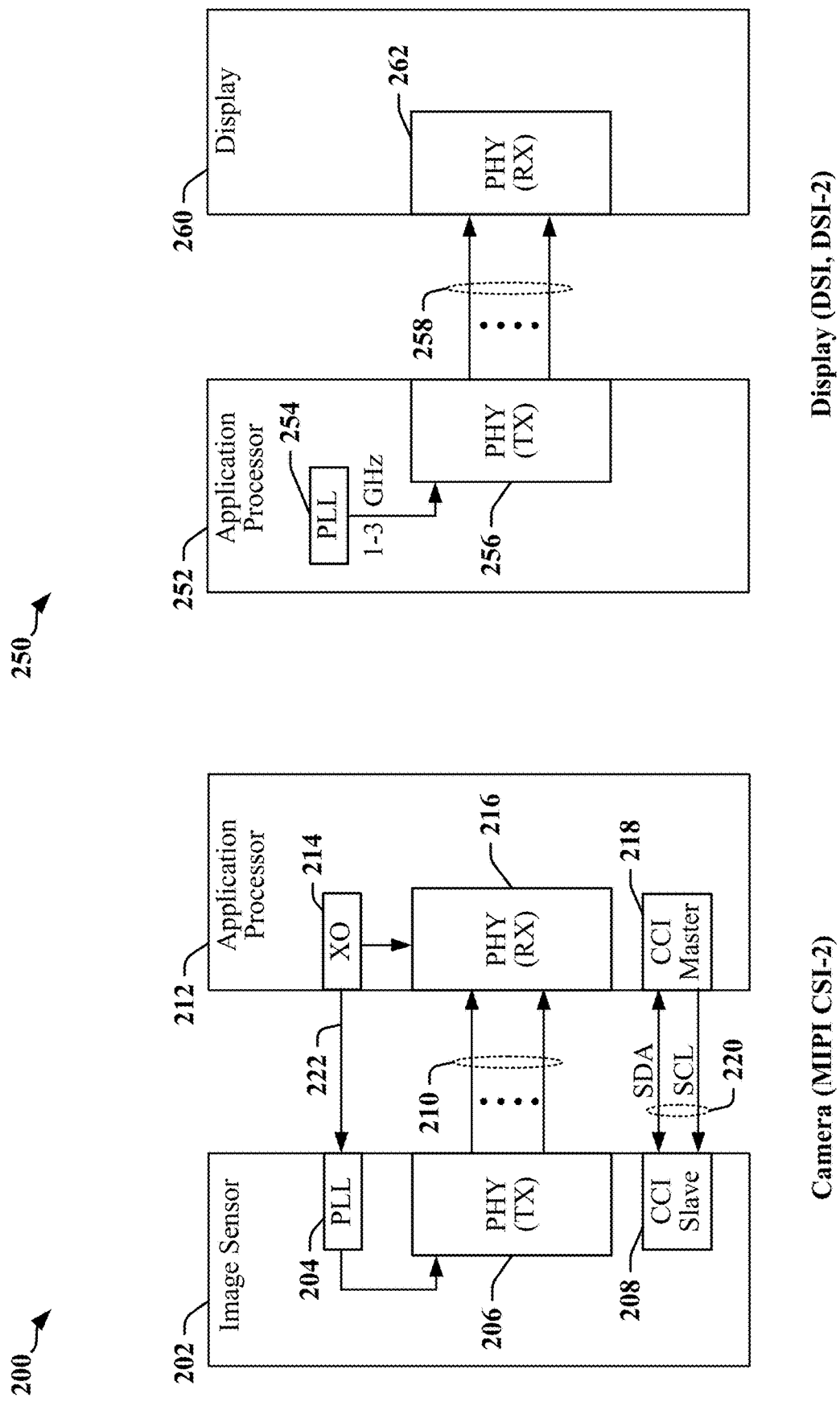
FIG. 2 illustrates examples of interface circuits that may be adapted in accordance with certain aspects of this disclosure.

FIG. 2 illustrates examples of interface circuits that may be employed or adapted in accordance with certain aspects of this disclosure. A first interface circuit is configured as a camera subsystem 200 and a second interface circuit is configured as a display subsystem 250. The interface circuits may be deployed in a mobile communication device, for example. The camera subsystem 200 may include a CSI-2 defined communication link between an image sensor 202 and an application processor 212. The communication link may include a high-data rate data transfer link 210 used by the image sensor 202 to transmit image data to the application processor 212 using a transmitter 206. The high-data rate data transfer link 210 may be configured and operated according to C-PHY protocols. The application processor 212 may include a crystal oscillator (XO 214) or other clock source to generate a clock signal 222 that controls the operation of the transmitter 206. The clock signal 222 may be processed by a phase-locked loop (PLL) 204 in the image sensor 202. In some instances, the clock signal 222 may also be used by the C-PHY receiver 216 in the application processor 212. The communication link may include a Camera Control Interface (CCI), which is similar in nature to the Inter-Integrated Circuit (I2C) interface. The CCI bus may include a Serial Clock (SCL) line that carries a clock signal and a Serial Data (SDA) line that carries data. The CCI link 220 may be bidirectional and may operate at a lower data rate than the high-data rate data transfer link 210. The CCI link 220 may be used by the application processor 212 to exchange control and configuration information with the image sensor 202. The application processor 212 may include a CCI bus master 218 and the image sensor 202 may include a CCI slave 208.

The display subsystem 250 may include a unidirectional data link 258 that can be configured and operated according to C-PHY protocols. In the application processor 252, a clock source such as the PLL 254 may be used to generate a bit clock signal used by a C-PHY receiver 256 to control transmissions on the data link 258. At the display device 260, a C-PHY receiver 262 may extract embedded clock information from sequences of symbols transmitted on the data link, or from a clock lane provided in the data link 258. Certain aspects disclosed herein relate to systems, apparatus and methods that support a broad range of interface protocols, and that can operate using different physical media. As shown in FIG. 2, for example, the camera subsystem 200 and/or display subsystem 250 may communicate high data rate information using C-PHY protocols. In some configurations, the camera subsystem 200 and/or display subsystem 250 may communicate using a reverse channel (e.g., the CCI link 220) for configuration of an image sensor 202 or other device. In some instances, a low-power mode of operation may be defined for links that use either C-PHY protocols.

Figure 3:
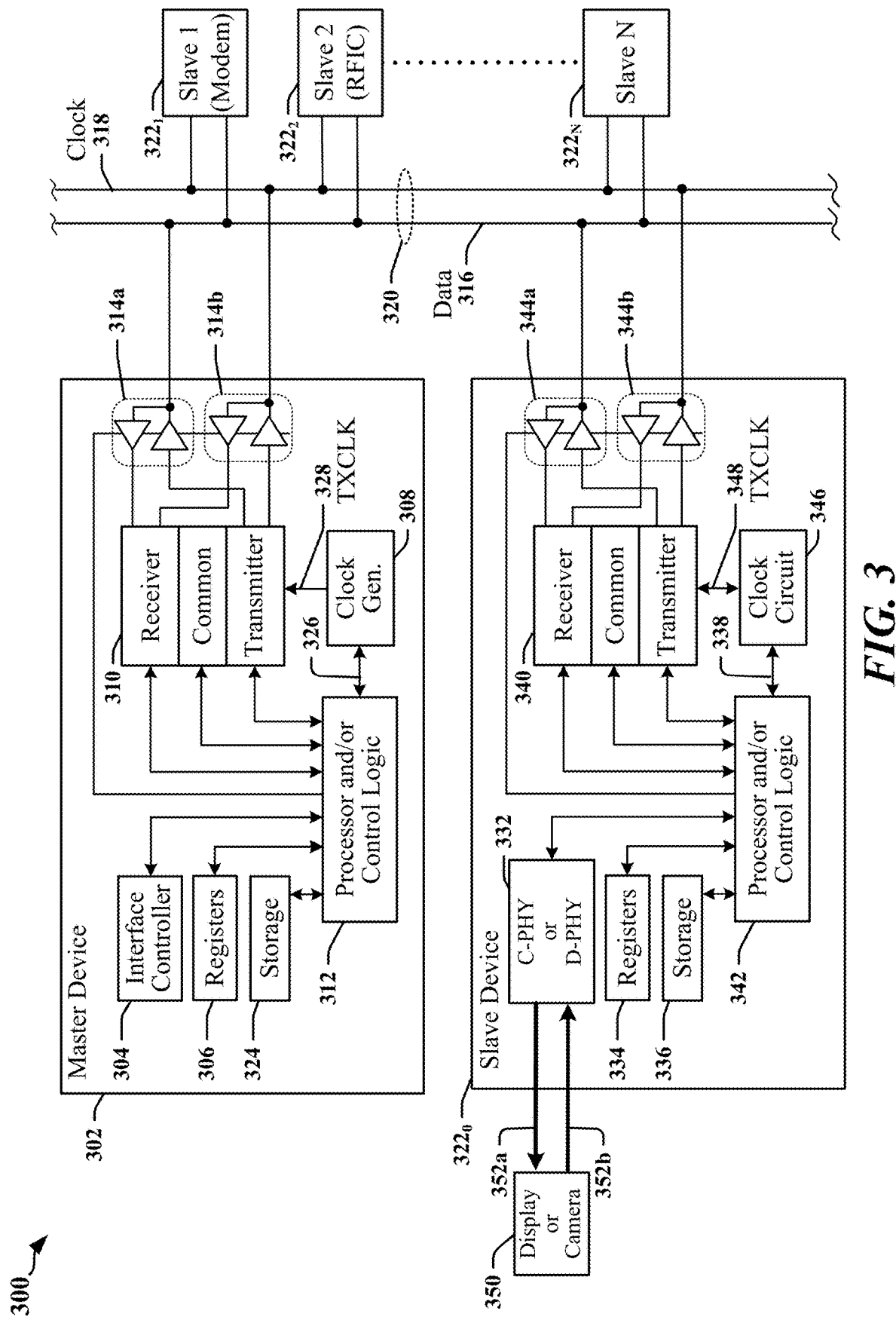
FIG. 3 illustrates a system architecture for an apparatus employing a C-PHY data link between IC devices.

FIG. 3 illustrates an example of an apparatus 300 employing a data link that may be used to communicatively couple two or more devices, subcomponents or circuits. Here, the apparatus 300 includes multiple devices 302, and 3220-322N coupled to a two-wire serial bus 320. The devices 302 and 3220-322N may be implemented in one or more semiconductor IC devices, such as an application processor, SoC or ASIC. In various implementations certain of the devices 302 and 3220-322N may include, support or operate as a modem, a signal processing device, a display driver, a camera, a user interface, a sensor, a sensor controller, a media player, a transceiver, and/or other such components or devices. In some examples, one or more devices 3220-322N may be used to control, manage or monitor a sensor device. Communication between devices 302 and 3220-322N over the serial bus 320 is controlled by a bus master device 302. Certain types of bus can support multiple bus masters 302.

In one example, a bus master device 302 includes an interface controller 304 that may be configured to manage access to the serial bus, configure dynamic addresses for slave devices and/or generate a clock signal 328 to be transmitted on a clock line 318 of the serial bus 320. The bus master device 302 may include configuration registers 306 or other storage 324, and other control logic 312 configured to handle protocols and/or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

At least one device 3220-322N may be configured to operate as a slave device on the serial bus 320 and may include circuits and modules that support a display, an image sensor, and/or circuits and modules that control and communicate with one or more sensors that measure environmental conditions. In one example, a device 3220 configured to operate as a slave device may provide a control function, physical layer circuit 332 that includes circuits and modules to support a display, an image sensor, and/or circuits and modules that control and communicate with one or more sensors that measure environmental conditions. In this example, the device 3220 can include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 340 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. In some instances, the clock signal 348 may be derived from a signal received from the clock line 318. Other timing clocks 338 may be used by the control logic 342 and other functions, circuits or modules.

The serial bus 320 may be operated in accordance with standards defined protocol or proprietary protocol. In some instances, two or more devices 302, 3220-322N may be configured to operate as a bus master device on the serial bus 320. In some instances, the apparatus 300 includes multiple serial buses 320, 352a and/or 352b that couple two or more of the devices 302, 3220-322N or one of the devices 302, 3220-322N and a peripheral device such as a display or camera 350 or a Radio-Frequency IC (RFIC). In some examples, one slave device 3220 is configured to operate as a display or camera coupled to a display or camera 350. The latter slave device 3220 may include a physical layer circuit 332 that is configured to operate as a C-PHY interface controller that communicates with the display or camera 350 over a serial bus 352a or 352b operated in accordance with a C-PHY protocol.

In certain aspects of this disclosure, systems and apparatus may employ multi-phase data encoding and decoding interface methods for communicating between IC devices. A multi-phase encoder may drive a plurality of conductors (i.e., 3 conductors). Each conductor may be referred to as a wire, although the conductors may include conductive traces on a circuit board or traces or interconnects within a conductive layer of a semiconductor IC device. In one example, a physical layer interface implemented using MIPI Alliance-defined C-PHY technology and protocols (i.e., a C-PHY interface) may be used to connect camera or display to an application processor. The C-PHY interface employs three-phase symbol encoding to transmit data symbols on 3-wire lanes, or "trios" where each trio includes an embedded clock. A trio may be referred to as a lane herein. A multi-lane C-PHY communication channel may be established using multiple trios to carry data exchanged between a pair of devices, where each channel includes one trio that carries a portion of the data, which may be independently encoded in accordance with C-PHY protocols.

The C-PHY interface provides a three-phase encoding scheme for a three-wire system. The three-phase encoding scheme defines three phase states and two polarities, providing 6 states and 5 possible transitions from each state. Deterministic voltage and/or current changes may be detected and decoded to extract data from the three wires.

Figure 4:
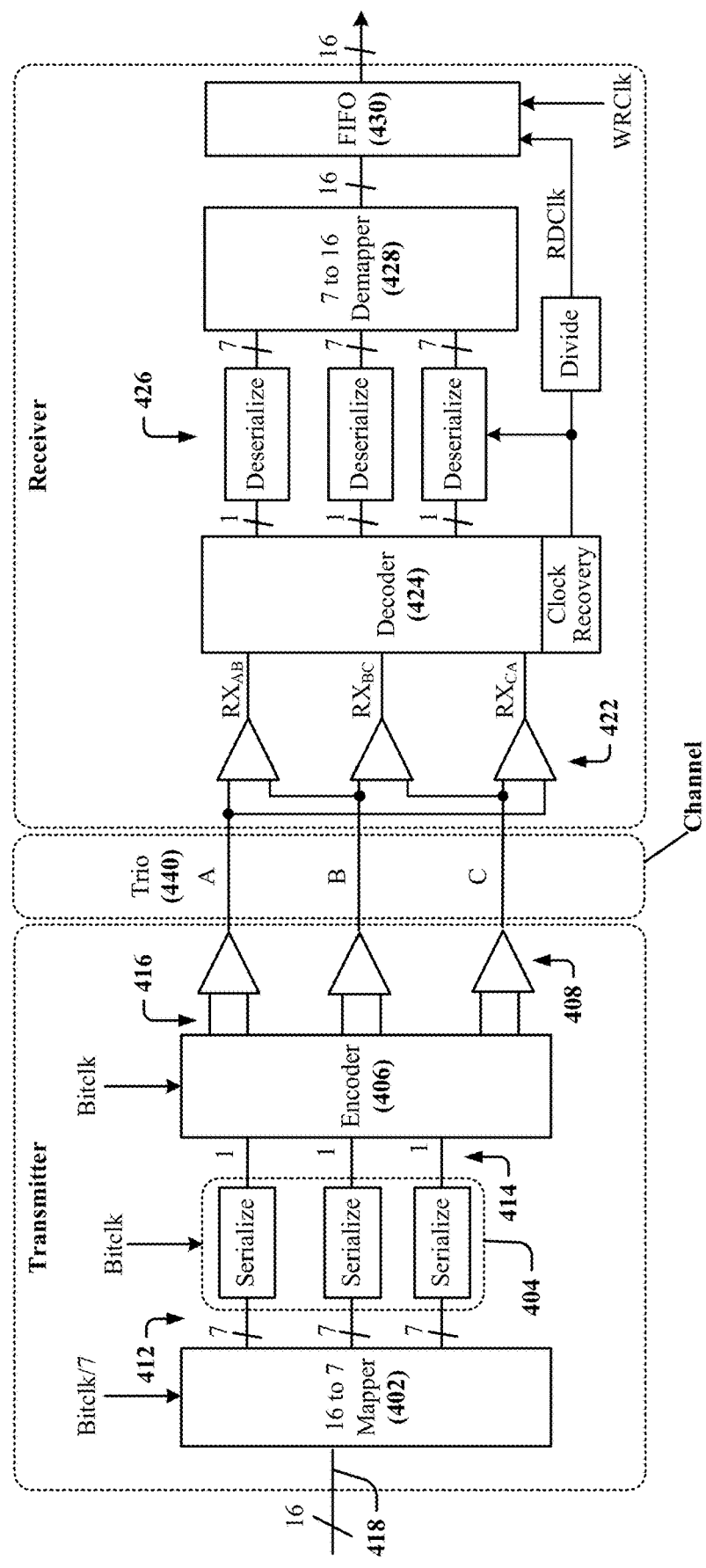
FIG. 4 illustrates an example of a C-PHY interface that may be adapted according to certain aspects disclosed herein.

FIG. 4 illustrates a C-PHY interface that may be used to implement certain aspects of the serial bus 352a or 352b depicted in FIG. 3. The illustrated example may relate to a three-wire link configured to carry three-phase polarity encoded data in accordance with DSI protocols. The use of 3-phase polarity encoding provides for high-speed data transfer and may consume half or less of the power of other interfaces at the desired operating frequency because fewer than 3 drivers are active at any time in a C-PHY link. The C-PHY interface uses 3-phase polarity encoding to encode multiple bits per symbol transition on the three-wire link. In one example, a combination of three-phase encoding and polarity encoding may be used to support a wide video graphics array (WVGA), 80 frames per second liquid crystal display driver IC without a frame buffer, delivering pixel data for display refresh at 810 Mbps over three or more wires.

In the depicted C-PHY interface, three-phase polarity encoding is used to control signaling state of connectors, wires, traces and other interconnects that provide a channel for communication. In the illustrated example, a single unidirectional channel, or lane, is provided using a combination of three wires (the trio 440). Each wire in the trio 440 may be undriven, driven positive, or driven negative in any symbol transmission interval. In some instances, an undriven signal wire of the trio 440 may be in a high-impedance state. In some instances, an undriven signal wire of the trio 440 may be driven or pulled to a voltage level that lies substantially halfway between the positive and negative voltage levels provided on driven signal wires. In some instances, an undriven signal wire of the trio 440 may have no current flowing through it. Drivers 408 in the transmitter 400 coupled to the signal wires of the trio 440 are controlled such that only one wire of the trio 440 is in each of three states (denoted as +1, −1, or 0) in each symbol interval.

In one example, the drivers 408 include unit-level current-mode drivers. In another example, the drivers 408 drive opposite polarity voltages on two signals transmitted on two signal wires of the trio 440 while the third signal wire is at high impedance and/or pulled to ground. For each transmitted symbol interval, at least one signal is in the undriven (0) state, while one signal is driven to the positive (+1 state) and one signal is driven to the negative (−1 state), such that the sum of current flowing to the receiver 420 is zero amperes. For each symbol, the state of at least one signal wire of the trio 440 is changed from the symbol transmitted in the preceding transmission interval.

In the transmitter 400, a mapper 402 may receive a 16-bit input data word 418, and the mapper 402 may map the input data word 418 to 7 symbols 412 for transmitting sequentially over the signal wires of the trio 440. An M-wire, N-phase encoder 406 configured for three-wire, three-phase encoding receives the 7 symbols 412 produced by the mapper one input symbol 414 at a time and computes the state of each signal wire of the trio 440 for each symbol interval, based on the immediately preceding state of the signal wires of the trio 440. The 7 symbols 412 may be serialized using parallel-to-serial converters 404, for example. The encoder 406 provides control signals 416 to define the outputs of the drivers 408. The encoder 406 selects the states of the signal wires of the trio 440 based on the input symbol 414 and the previous states of signal wires of the trio 440 and may provide control signals 416 to cause the drivers 408 to produce the desired signaling state on the trio 440.

The use of three-wire, three-phase encoding permits several bits to be encoded in a plurality of symbols where the bits per symbol is not an integer. In the example of a three-wire, three-phase system, there are 3 available combinations of 2 wires, which may be driven simultaneously, and 2 possible combinations of polarity on the simultaneously driven pair of wires, yielding 6 possible states. Since each transition occurs from a current state, 5 of the 6 states are available at every transition. With 5 states, $\log_2(5)=2.32$ bits may be encoded per symbol transition. Accordingly, a mapper may accept a 16-bit word and convert it to a 7-symbol sequence because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

In the illustrated example, the receiver 420 includes comparators 422 and a decoder 424 that are configured to provide a digital representation of the state of each of three signal wires of the trio 440, as well as the change in the state of the three signal wires compared to the state transmitted in the previous symbol period. Seven consecutive states are assembled by serial-to-parallel convertors 426 and used to produce a set of 7 symbols to be processed by a demapper 428 to obtain 16 bits of data that may be buffered in a first-in-first-out (FIFO) storage device 430, which may be implemented using registers, for example.

Figure 5:
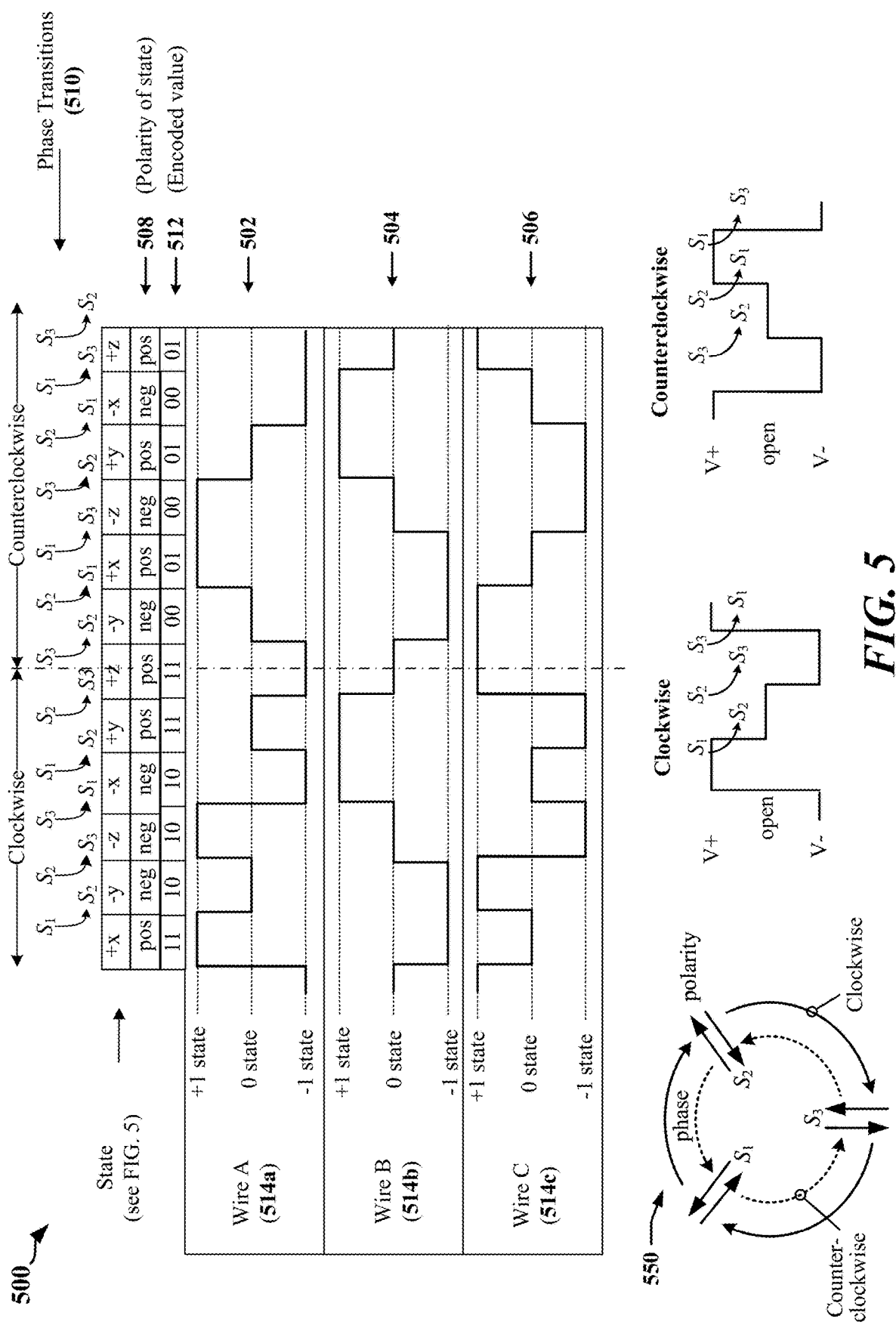
FIG. 5 illustrates signaling in an example of an N-phase polarity encoded interface.

FIG. 5 illustrates an example of signaling 500 employing a 3-phase modulation data-encoding scheme based on the circular state transition diagram 550. According to the data-encoding scheme, the phase of a 3-phase signal may rotate in two directions and may be transmitted on three wires 514a, 514b and 514c, identified as connectors A, B, and C. Each of the three signals is independently driven on the wires 514a, 514b, 514c. Each of the three signals includes the 3-phase signal, with each signal being 120 degrees out of phase relative to the other two signals. At any point in time, each of the three wires 514a, 514b, 514c is in a different one of the states {+1, 0, −1}. At any point in time, each of the three wires 514a, 514b, 514c in a 3-wire system is in a different state than the other two wires. When more than three conductors or wires are used, two or more pairs of wires may be in the same state. The illustrated encoding scheme may also encode information in the polarity of the two wires 514a, 514b and/or 514c that are actively driven to the +1 and −1 states. Polarity is indicated at 508 for the sequence of states depicted.

At any phase state in the illustrated 3-wire example, exactly two of the wires 514a, 514b, 514c carry a signal which is effectively a differential signal for that phase state, while the third wire 514a, 514b or 514c is undriven. The phase state for each wire 514a, 514b, 514c may be determined by voltage difference between the wire 514a, 514b or 514c and at least one other wire 514a, 514b and/or 514c, or by the direction of current flow, or lack of current flow, in the wire 514a, 514b or 514c. As shown in the state transition diagram 550, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counterclockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular phase rotation between state transitions.

In the example of a 3-wire, 3-phase communication link, clockwise phase rotations (Si to $S_2$), ($S_2$ to $S_3$), and/or ($S_3$ to $S_1$) at a phase transition 510 (between states) may be used to encode a logic 1, while counterclockwise phase rotations (Si to $S_3$), ($S_3$ to $S_2$), and/or ($S_2$ to $S_1$) at the phase transition 510 may be used to encode a logic 0. Accordingly, a bit may be encoded at each transition by controlling whether the phase of the signal is "rotating" clockwise or counterclockwise. For example, a logic 1 may be encoded when the three wires 514a, 514b, 514c transition from phase state Si to phase state $S_2$ and a logic 0 may be encoded when the three wires 514a, 514b, 514c transition from phase state Si to phase state $S_3$. In the 3-wire example depicted, direction of phase rotation may be easily determined based on which of the three wires 514a, 514b, 514c is undriven before and after the transition.

Information may also be encoded in the polarity and/or changes of polarity of state 508 of the driven wires 514a, 514b, 514c, or in the direction of current flow or changes in the direction of current flow between two wires 514a, 514b, 514c. Signals 502, 504, and 506 illustrate voltage levels applied to wires 514a, 514b, 514c, respectively at each phase state in a 3-wire, 3-phase link. At any time, a first wire 514a, 514b, 514c is coupled to a more positive voltage (+V, for example), a second wire 514a, 514b, 514c is coupled to a more negative voltage (−V, for example), while the third wire 514a, 514b, 514c may be open-circuited. As such, one polarity encoding state may be determined by the current flow between the first and second wires 514a, 514b, 514c or the voltage polarities of the first and second wires 514a, 514b, 514c. In some embodiments, two bits of data 512 may be encoded in each phase transition 510. A decoder may determine the direction of signal phase rotation to obtain the first bit. The second bit may be determined based on the polarity difference between two of the signals 502, 504 and 506. In some instances, the second bit may be determined based on a change or lack of change in polarity of the differential signal transmitted on a pair of the wires 514a, 514b, 514c. The decoder having determined direction of phase rotation can determine the phase state and the polarity of the voltage applied between the two active wires 514a, 514b and/or 514c, or the direction of current flow through the two active wires 514a, 514b and/or 514c.

In the example of the 3-wire, 3-phase link described herein, one bit of data may be encoded in the phase rotation, or phase change in the 3-wire, 3-phase link, and an additional bit may be encoded in the polarity or changes in polarity of two driven wires. In certain embodiments, more than two bits can be encoded in each transition of a 3-wire, 3-phase encoding system by allowing transition to any of the possible states from a current state. Given three rotational phases and two polarities for each phase, 6 states are defined, such that 5 states are available from any current state. Accordingly, there may be $\log_2(5)=2.32$ bits per symbol (transition) and the mapper may accept a 16-bit word and convert it to 7 symbols.

Figure 6:
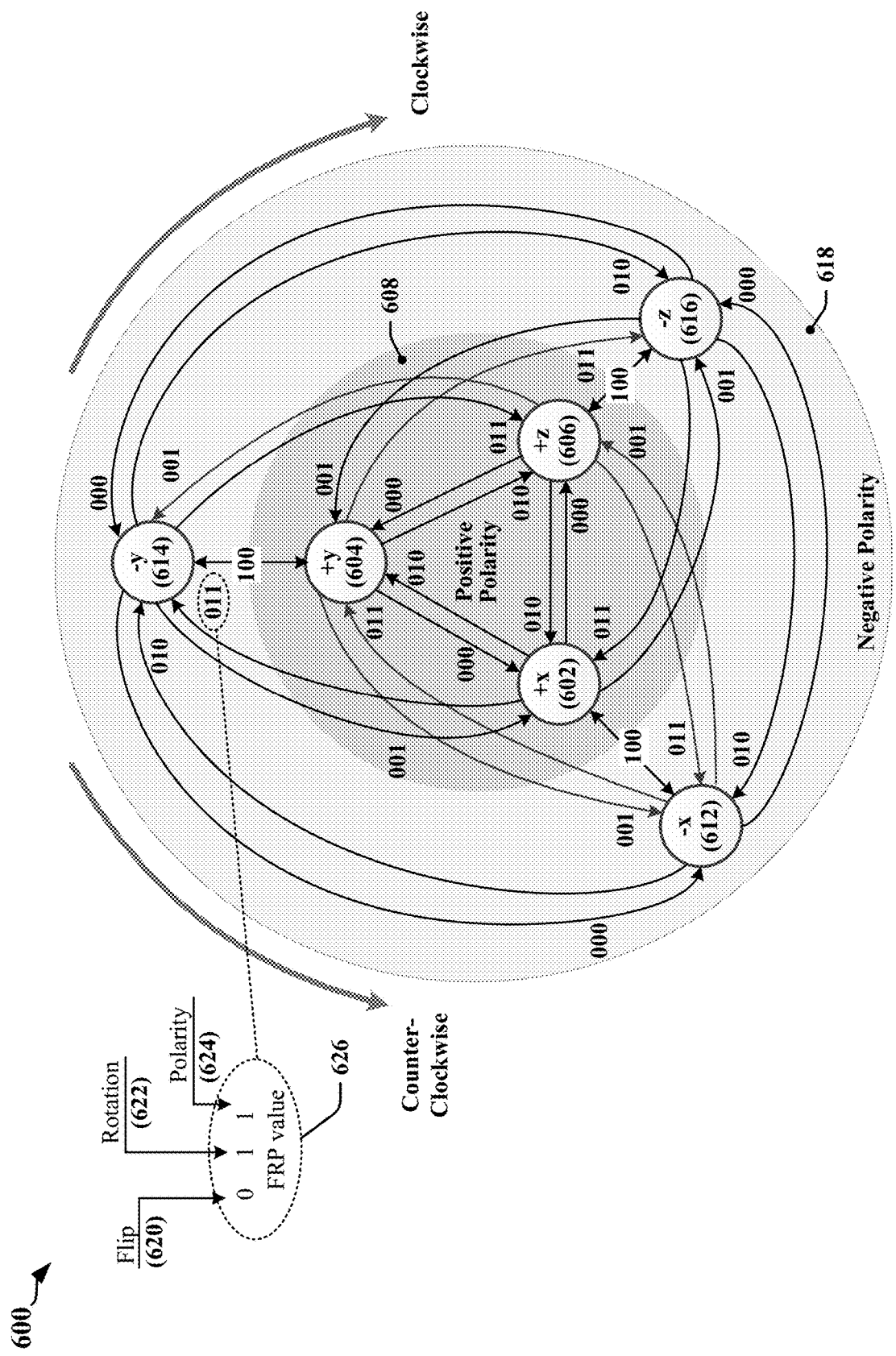
FIG. 6 is state diagram illustrating signaling states and transitions between signaling states in a C-PHY interface implemented in accordance with certain aspects disclosed herein.

FIG. 6 is a state transition diagram 600 illustrating the possible signaling states 602, 604, 606, 612, 614, 616 of the three wires in a 3-wire, 3-phase interface, including in a MIPI Alliance C-PHY high-speed mode interface for example. All possible transitions from each signaling state 602, 604, 606, 612, 614, 616 are illustrated. The transitions in the state transition diagram 600 can be represented by a Flip, Rotate, Polarity (FRP) symbol 626 that has one of the three-bit binary values in the set: {000, 001, 010, 011, 100}. The Rotate bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state transition diagram 600 may be separated into an inner circle 608 that includes the positive polarity signaling states 602, 604, 606 and an outer circle 618 that encompasses the negative polarity signaling states 612, 614, 616.

Figure 7:
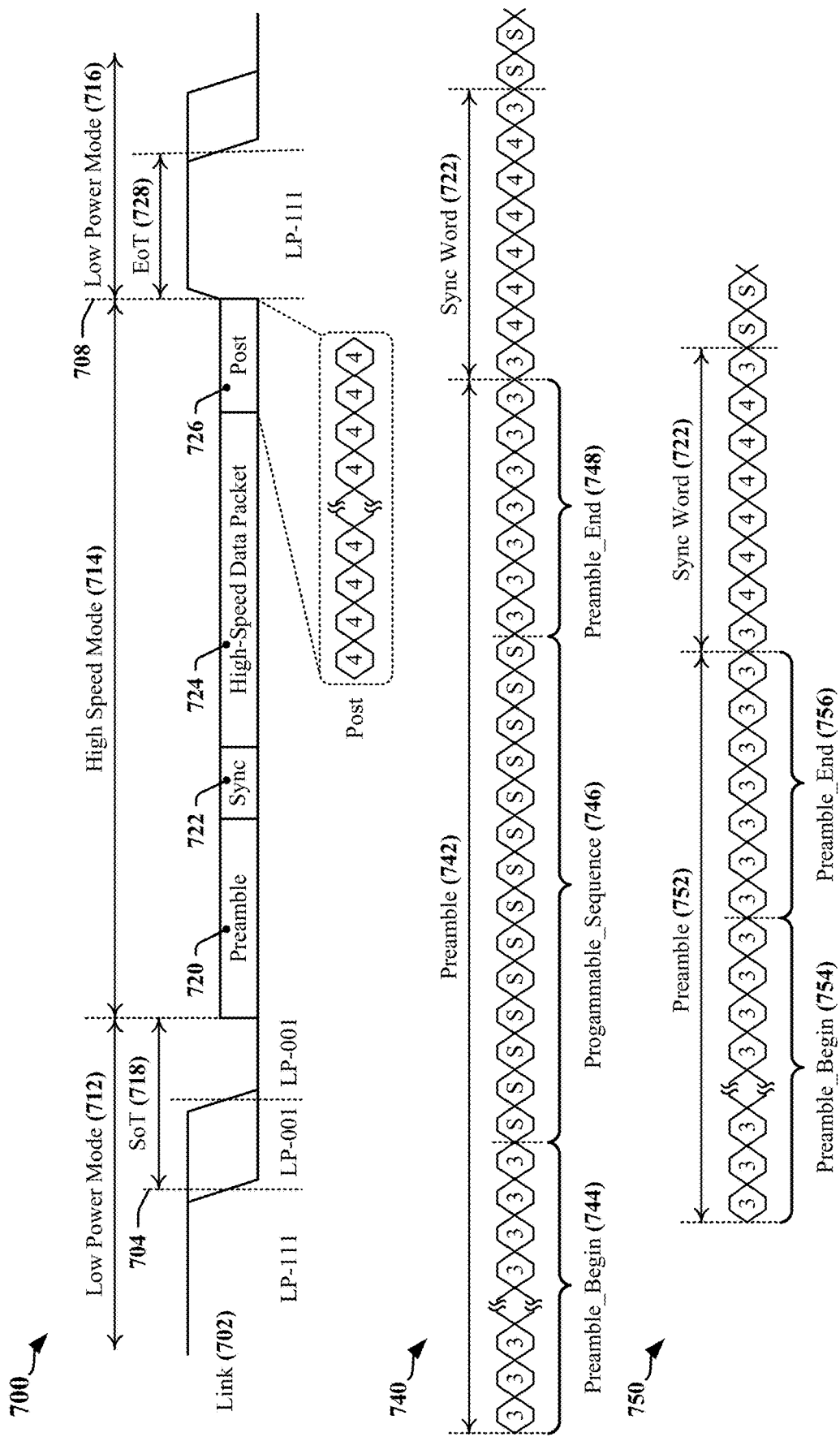
FIG. 7 illustrates certain aspects of data transmission in a C-PHY interface adapted in accordance with certain aspects disclosed herein.

FIG. 7 illustrates certain aspects of signaling on a data communication link 702 operated in accordance with C-PHY protocols. A high-speed transaction 700 is illustrated in which a C-PHY interface is initially configured for a low-power mode of operation 712. Commencing at a first time 704, the SoT sequence 718 is transmitted to switch the C-PHY interface to a low-voltage, high-speed mode of operation 714 in which data is transmitted. In the speed mode of operation 714, low-voltage differential (3-phase) signaling is used. Commencing at a second time 708, an EoT sequence 728 is transmitted to return the C-PHY interface to a low-power mode of operation 716. A "postamble" (POST pattern 726) is provided at the end of a high-speed data transmission to provide a reliable notification of the end of a high-speed burst to the receiver. In some instances, a receiver may determine that the C-PHY interface is configured for the low-power mode of operation 716 based on detection of signaling at the higher voltage levels associated with the low-power mode.

A C-PHY interface adapted according to certain aspects of this disclosure transitions from high-speed to low-power modes after transmission of a POST pattern 726 defined by C-PHY protocols. According to C-PHY protocols, the POST pattern 726 is provided at the end of a high-speed data transmission to provide a reliable notification of the end of the high-speed data transmission. The POST pattern 726 includes a series of unmapped code words (e.g., a sequence in which all symbols have a value of "4"). An unmapped code word may refer to a 7-symbol sequence that is not used to encode data. The SoT sequence 718 is transmitted to initiate the high-speed mode of operation 714, and in one example, may be defined as the sequence {LP-111, LP-001, LP-000}. The SoT sequence 718 may be preceded and followed by pauses in transmission. The EoT sequence 728 may be occur when the LP-111 state is transmitted for a period of time before a minimum duration in a bus idle state.

A high-speed data transmission includes a data packet 724 that includes one or more 7-symbol sequences, each 7-symbol sequence encoding a data word. Encoding and decoding can be accomplished using mapping tables that associate each permutation of 16 bits with a combination of 7 symbols. Each symbol may be an FRP symbol that determines the next signaling state of a trio based on a current signaling state of the trio. state of defines. The C-PHY encoding scheme employs symbols and a 7-symbol combination yields a total of 78,125 permutations (5⁷) of which 65,536 (2¹⁶) are uniquely associated with one of the 16 bit possible values for the data word. Accordingly, 12,589 7-symbol combinations are nominally available for control use in control sequences.

C-PHY protocols define certain 7-symbol sequences that may be reserved for training, synchronization and control purposes. For example, a data packet 724 is preceded in transmission by a preamble 720 and a Sync Word 722 and the data transmission is terminated by the POST pattern 726. The preamble 720, Sync Word 722 and POST pattern 726 each include one or more reserved 7-symbol sequences. In the illustrated example, two initiation sequences 740 and 750 are shown. The initiation sequences 740 and 750 have different types of preambles.

In the first initiation sequence 740, the preamble 742 includes a programmable sequence 746 that may be used to configure, train or otherwise communicate control information to a receiver. The preamble 742 includes a Preamble_Begin sequence 744 followed by the programmable sequence 746 and completed by a Preamble_End sequence 748.

In the illustrated example, the Preamble_Begin sequence 744 includes repeated instances of a 7-symbol sequence in which every symbol has a value of '3'. The number of repetitions may be defined by protocol, by application or by configuration during calibration. The programmable sequence 746 includes some number of 7-symbol sequences that may include reserved symbols or encoded data words. The number, type and interpretation of the 7-symbol sequences in the programmable sequence 746 may be defined by protocol, by application or by configuration during calibration. In the illustrated example, the Preamble_End sequence 748 includes a single 7-symbol sequence in which every symbol has a value of '3'.

In the second initiation sequence 750, the preamble 752 includes a Preamble_Begin sequence 754 followed immediately by the Preamble_End sequence 756. In the illustrated example, the Preamble_Begin sequence 754 includes repeated instances of a 7-symbol sequence in which every symbol has a value of '3'. The number of repetitions may be defined by protocol, by application or by configuration during calibration. In the illustrated example, the Preamble_End sequence 756 includes a single 7-symbol sequence in which every symbol has a value of '3'.

Both initiation sequences 740 and 750 end with a Sync Word 722. In the illustrated example, the Preamble_End sequences 748, 756 include a single 7-symbol sequence that has a first and last transmitted symbol with a value of the '3' and 5 intervening symbols that have a value of '4'. The data packet 724 follows the Sync Word 722 in transmission. According to C-PHY protocols, a receiver is configured to recognize and respond to a Sync Word 722 after receiving 5 symbols that have a value of '4' followed by a symbol that has a value of the '3'. In the illustrated example, the POST pattern 726 includes repeated instances of a 7-symbol sequence in which every symbol has a value of '4'. The number of repetitions may be defined by protocol, by application or by configuration during calibration.

The rate at which symbols are transmitted over a C-PHY data link may be increased to address the continual demand for higher data rates. For example, version 2.0 of the MIPI C-PHY specifications permits increased transmission clock rates of between 4.5 GHz and 6.0 GHz. Increasing transmission clock frequencies can decrease the tolerances and margins defined for data signals and can magnify signal integrity issues at the C-PHY receiver. Certain control patterns transmitted during C-PHY transactions may be more easily corrupted when transmission clock rates are increased, and a failure to detect or respond to such corruptions may result in loss of data throughput over the C-PHY interface. For example, the physical-layer (PHY) interface in a C-PHY receiver may face increased challenges in detecting Sync, Preamble and POST sequences due to signal integrity issues or, in some instances, due to an untuned or improperly tuned analog receiver. Signal integrity issues, and an untuned or improperly tuned analog receiver, can cause decoders in the receiver PHY to receive corrupted Sync, Preamble, POST and other control sequences.

Certain aspects of this disclosure enable a C-PHY receiver to identify corrupt data packets by identifying certain lost or corrupted key patterns or sequences of symbols. Detection of corrupted patterns can facilitate a more rapid initiation and calibration of the C-PHY receiver and can thereby promote faster system start up.

Figure 8:
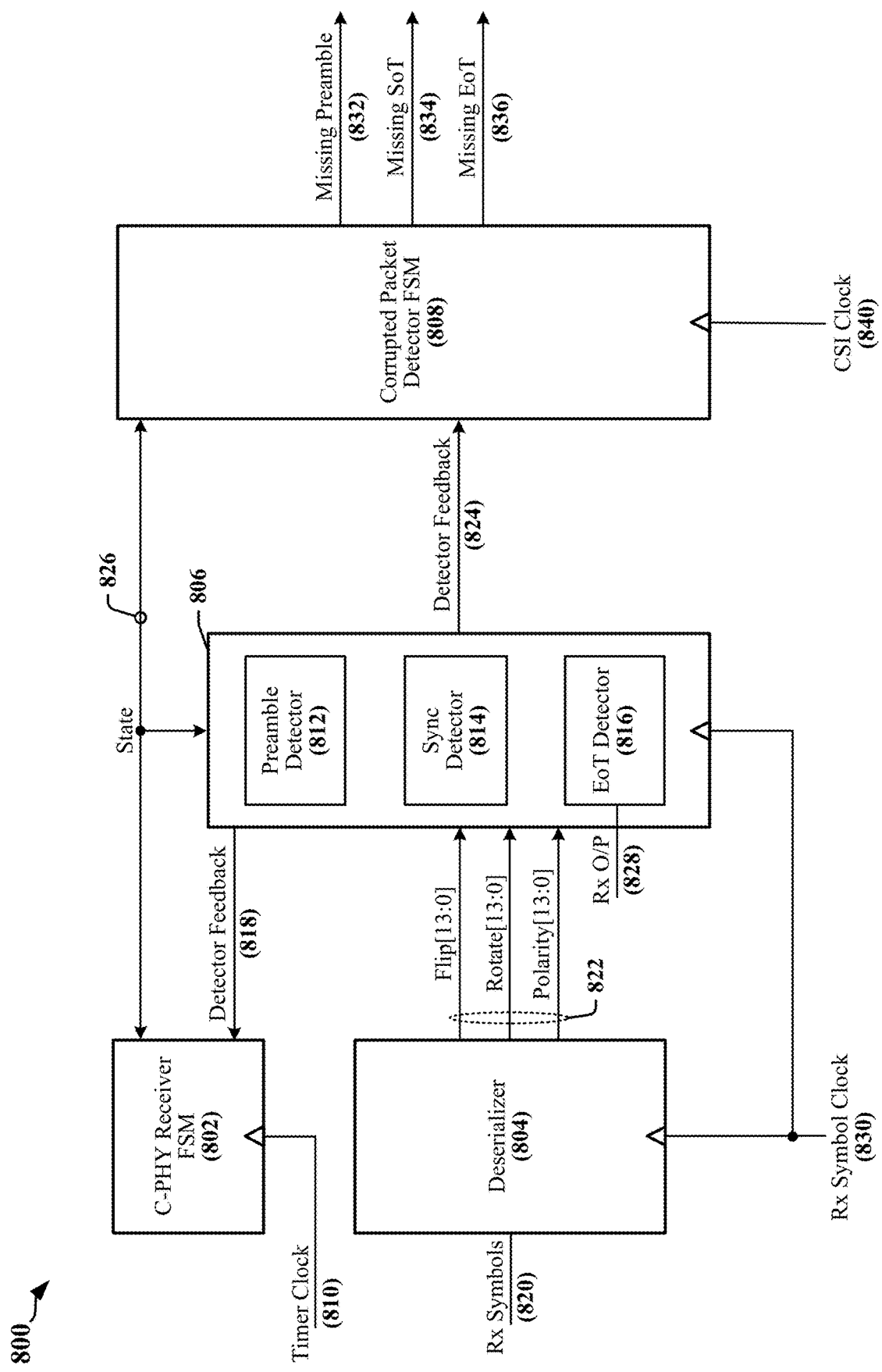
FIG. 8 illustrates certain aspects of a C-PHY receiver that has been configured to detect corrupted packets in accordance with certain aspects of this disclosure.

FIG. 8 illustrates certain aspects of a C-PHY receiver 800 that has been configured to detect corrupted packets in accordance with certain aspects of this disclosure. Detection of corrupted packets may be accomplished by monitoring the timing, location and/or structure of certain control sequences, including the Sync, Preamble, POST and EoT sequences. According to one aspect, detection of corrupted received packets can enable early detection of signal integrity issues or marginal settings of an analog receiver in the C-PHY receiver 800. The corrupted packets may be discarded. In some instances, one or more circuits in the C-PHY receiver 800 can be recalibrated to improve signal integrity and/or to reduce or eliminate the number or rate of corrupted packets.

In the illustrated example, a detection module 806 is configured to monitor a received symbol datastream 820 and to recognize and indicate certain patterns in the symbol datastream 820 patterns that correspond to control sequences. The symbol datastream 820 is received by a deserializer 804 that provides an output signal 822 in which successive blocks of 14 symbols are output in parallel. The deserializer 804 may be clocked by a symbol clock signal 830 representative of the transmission clock used to control symbol transmission rate over a trio and may derived from a clock recovery circuit. In one example, the deserializer 804 provides an output that includes fourteen 3-bit FRP symbols, where the FRP symbols may correspond to the FRP symbols illustrated in FIGS. 5 and 6.

In the illustrated example, the detection module 806 includes three detection circuits 812, 814, 816 that are each configured to detect a pattern of symbols that correspond to a control sequence. Certain of the detection circuits 812, 814, 816 may be implemented using one or more symbol comparators configured to match a multi-symbol word in the output signal 822 with a corresponding number of symbols configured to represent the control sequence to be detected. In one example, a Sync detection circuit 812 is configured to recognize a pattern of symbols that corresponds to a Sync sequence regardless of where the pattern of symbols occurs in a high-speed transmission received from the C-PHY trio. In one example, a Preamble detection circuit 814 is configured to recognize a pattern of symbols that corresponds to a Preamble sequence regardless of where the pattern of symbols occurs in a high-speed transmission. In one example, an EoT detection circuit 816 is configured to recognize a pattern of symbols that corresponds to a EoT sequence regardless of where the pattern of symbols occurs in the high-speed transmission. The detection circuits 812, 814, 816 may be triggered when a pattern of symbols includes a minimum number of symbols defined by protocol for the associated control sequence.

The symbol clock signal 830 may be divided by a counter or divider provided in the C-PHY receiver 800 in order to obtain a sampling window signal. In the illustrated example, the period of the sampling window signal corresponds to fourteen periods of the symbol clock signal 830 and indicates a sampling window during which pattern detection may be performed. In some instances, the sampling window signal is used to clock the output of the deserializer 804 into a register or FIFO (not shown) that feeds the detection circuits 812, 814, 816. In some instances, the pattern detector signal is monitored by a finite state machine (the corrupted packet detector FSM 808) that is configured to respond to the output of the detection module 806.

In the illustrated example, the corrupted packet detector FSM 808 receives feedback and other state information related to the operation of the detection module 806. A feedback signal 824 provided to the corrupted packet detector FSM 808 by the detection module 806 may be a multi-bit signal that includes information representative of, or otherwise corresponding to outputs provided by the detection circuits 812, 814, 816. The feedback signal 824 may include the state of the sampling window signal. In some instances, the output of the detection circuits 812, 814, 816 may be captured by the corrupted packet detector FSM 808 based on the state or a transition in state of the sampling window signal. In some instances, the sampling window signal is used by the corrupted packet detector FSM 808 to monitor the output of the detection module 806. The detection module 806 may further provide a feedback signal 818 to one or more finite state machines that control the operation of the C-PHY interface, represented in the illustrated example by the C-PHY receiver finite state machine (C-PHY receiver FSM 802).

In the illustrated example, the corrupted packet detector FSM 808 is configured to generate three flags 832, 834, 836 indicating a missing preamble, a missing SOT and a missing EOT. Each of the three flags 832, 834, 836 signals potential packet corruption when activated. The detection module 806 may be activated when a SoT sequence is detected. With reference to FIG. 7, the SoT sequence 718 is transmitted to initiate the high-speed mode of operation 714, and in one example, may be defined as the sequence {LP-111, LP-001, LP-000}. The detection circuits 812, 814, 816 can begin monitoring the symbol datastream 820 after SoT has been detected and may cease monitoring when EoT is detected. In one example, the preamble detector 812 searches for a preamble pattern within a sampling window that occurs after the SoT. If the Preamble pattern is not detected, the preamble detector 812 may assert the missing Preamble flag 832. The Sync detector 814 may be configured to search for a Sync pattern within a programmable time window after the SoT sequence 718. The Sync detector 814 may assert the missing SoT flag 834 if the SYNC pattern is not detected within the specified window. In some implementations, the window defined for occurrence of a Sync may be defined based on C-PHY specifications defined by the MIPI Alliance. The EOT detector 816 may be configured to search for an EOT pulse in a signal 828 received from one or more receivers in the receiver PHY. The EOT detector 816 may assert the missing EoT flag 836 when an LP000 to LP111 transition (indicative of SoT) is detected before the EOT pulse.

The C-PHY receiver FSM 802 may receive a timer clock signal 810 that may be used to define the duration of sampling windows used by the detection circuits 812, 814, 816. The C-PHY receiver FSM 802 may exchange state and/or control information 826 with the detection module 806 and the corrupted packet detector FSM 808. The C-PHY receiver FSM 802 may be clocked by a clock signal 840 generated by the C-PHY receiver 800. The C-PHY receiver FSM 802 may be configured to respond to the flags 832, 834, 836 by causing one or more packets to be discarded and by restoring the state of the receiver PHY to an idle state. The C-PHY receiver FSM 802 may be further configured to disable symbol processing until determining that a next valid SoT followed by valid preamble and Sync sequences has been received.

The assertion of one or more of the flags 832, 834, 836 can indicate that at least one received packet is corrupted, and can enable early detection of signal integrity issues or marginal analog receiver settings. Corrective action may include recalibration of receivers and equalizers and/or changes in data rate. In one example, a change in data rate may avoid frequency relate electromagnetic interference.

Examples of Processing Circuits and Methods

Figure 9:
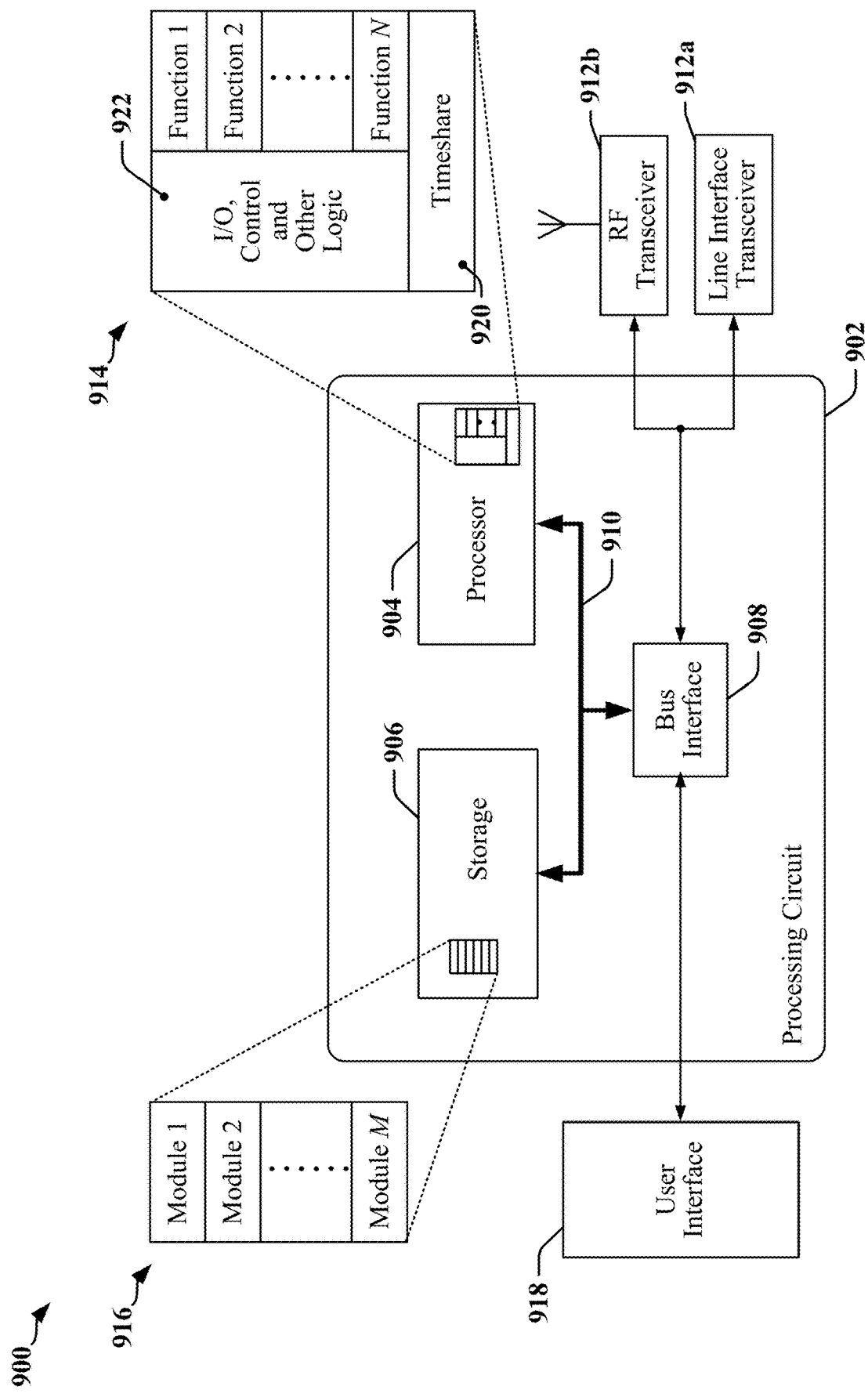
FIG. 9 illustrates one example of an apparatus employing a processing circuit that may be adapted in accordance with certain aspects disclosed herein.

FIG. 9 is a diagram illustrating an example of a hardware implementation for an apparatus 900. In some examples, the apparatus 900 may perform one or more functions disclosed herein. In accordance with various aspects of the disclosure, an element, or any portion of an element, or any combination of elements as disclosed herein may be implemented using a processing circuit 902. The processing circuit 902 may include one or more processors 904 that are controlled by some combination of hardware and software modules. Examples of processors 904 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 904 may include specialized processors that perform specific functions, and that may be configured, augmented or controlled by one of the software modules 916. The one or more processors 904 may be configured through a combination of software modules 916 loaded during initialization, and further configured by loading or unloading one or more software modules 916 during operation.

In the illustrated example, the processing circuit 902 may be implemented with a bus architecture, represented generally by the bus 910. The bus 910 may include any number of interconnecting buses and bridges depending on the specific application of the processing circuit 902 and the overall design constraints. The bus 910 links together various circuits including the one or more processors 904, and storage 906. Storage 906 may include memory devices and mass storage devices, and may be referred to herein as computer-readable media and/or processor-readable media. The bus 910 may also link various other circuits such as timing sources, timers, peripherals, voltage regulators, and power management circuits. A bus interface 908 may provide an interface between the bus 910 and one or more transceivers 912a, 912b. A transceiver 912a, 912b may be provided for each networking technology supported by the processing circuit. In some instances, multiple networking technologies may share some or all of the circuitry or processing modules found in a transceiver 912a, 912b. Each transceiver 912a, 912b provides a means for communicating with various other apparatus over a transmission medium. In one example, a transceiver 912a may be used to couple the apparatus 900 to a multi-wire bus. In another example, a transceiver 912b may be used to connect the apparatus 900 to a radio access network. Depending upon the nature of the apparatus 900, a user interface 918 (e.g., keypad, display, speaker, microphone, joystick) may also be provided, and may be communicatively coupled to the bus 910 directly or through the bus interface 908.

A processor 904 may be responsible for managing the bus 910 and for general processing that may include the execution of software stored in a computer-readable medium that may include the storage 906. In this respect, the processing circuit 902, including the processor 904, may be used to implement any of the methods, functions and techniques disclosed herein. The storage 906 may be used for storing data that is manipulated by the processor 904 when executing software, and the software may be configured to implement certain methods disclosed herein.

One or more processors 904 in the processing circuit 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 906 or in an external computer-readable medium. The external computer-readable medium and/or storage 906 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 906 may also include, by way of example, a carrier wave, a transmission line, and any other suitable medium for transmitting software and/or instructions that may be accessed and read by a computer. Computer-readable medium and/or the storage 906 may reside in the processing circuit 902, in the processor 904, external to the processing circuit 902, or be distributed across multiple entities including the processing circuit 902. The computer-readable medium and/or storage 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 906 may maintain software maintained and/or organized in loadable code segments, modules, applications, programs, etc., which may be referred to herein as software modules 916. Each of the software modules 916 may include instructions and data that, when installed or loaded on the processing circuit 902 and executed by the one or more processors 904, contribute to a run-time image 914 that controls the operation of the one or more processors 904. When executed, certain instructions may cause the processing circuit 902 to perform functions in accordance with certain methods, algorithms and processes described herein.

Some of the software modules 916 may be loaded during initialization of the processing circuit 902, and these software modules 916 may configure the processing circuit 902 to enable performance of the various functions disclosed herein. For example, some software modules 916 may configure internal devices and/or logic circuits 922 of the processor 904, and may manage access to external devices such as a transceiver 912a, 912b, the bus interface 908, the user interface 918, timers, mathematical coprocessors, and so on. The software modules 916 may include a control program and/or an operating system that interacts with interrupt handlers and device drivers, and that controls access to various resources provided by the processing circuit 902. The resources may include memory, processing time, access to a transceiver 912a, 912b, the user interface 918, and so on.

One or more processors 904 of the processing circuit 902 may be multifunctional, whereby some of the software modules 916 are loaded and configured to perform different functions or different instances of the same function. The one or more processors 904 may additionally be adapted to manage background tasks initiated in response to inputs from the user interface 918, the transceiver 912a, 912b, and device drivers, for example. To support the performance of multiple functions, the one or more processors 904 may be configured to provide a multitasking environment, whereby each of a plurality of functions is implemented as a set of tasks serviced by the one or more processors 904 as needed or desired. In one example, the multitasking environment may be implemented using a timesharing program 920 that passes control of a processor 904 between different tasks, whereby each task returns control of the one or more processors 904 to the timesharing program 920 upon completion of any outstanding operations and/or in response to an input such as an interrupt. When a task has control of the one or more processors 904, the processing circuit is effectively specialized for the purposes addressed by the function associated with the controlling task. The timesharing program 920 may include an operating system, a main loop that transfers control on a round-robin basis, a function that allocates control of the one or more processors 904 in accordance with a prioritization of the functions, and/or an interrupt driven main loop that responds to external events by providing control of the one or more processors 904 to a handling function.

Figure 10:
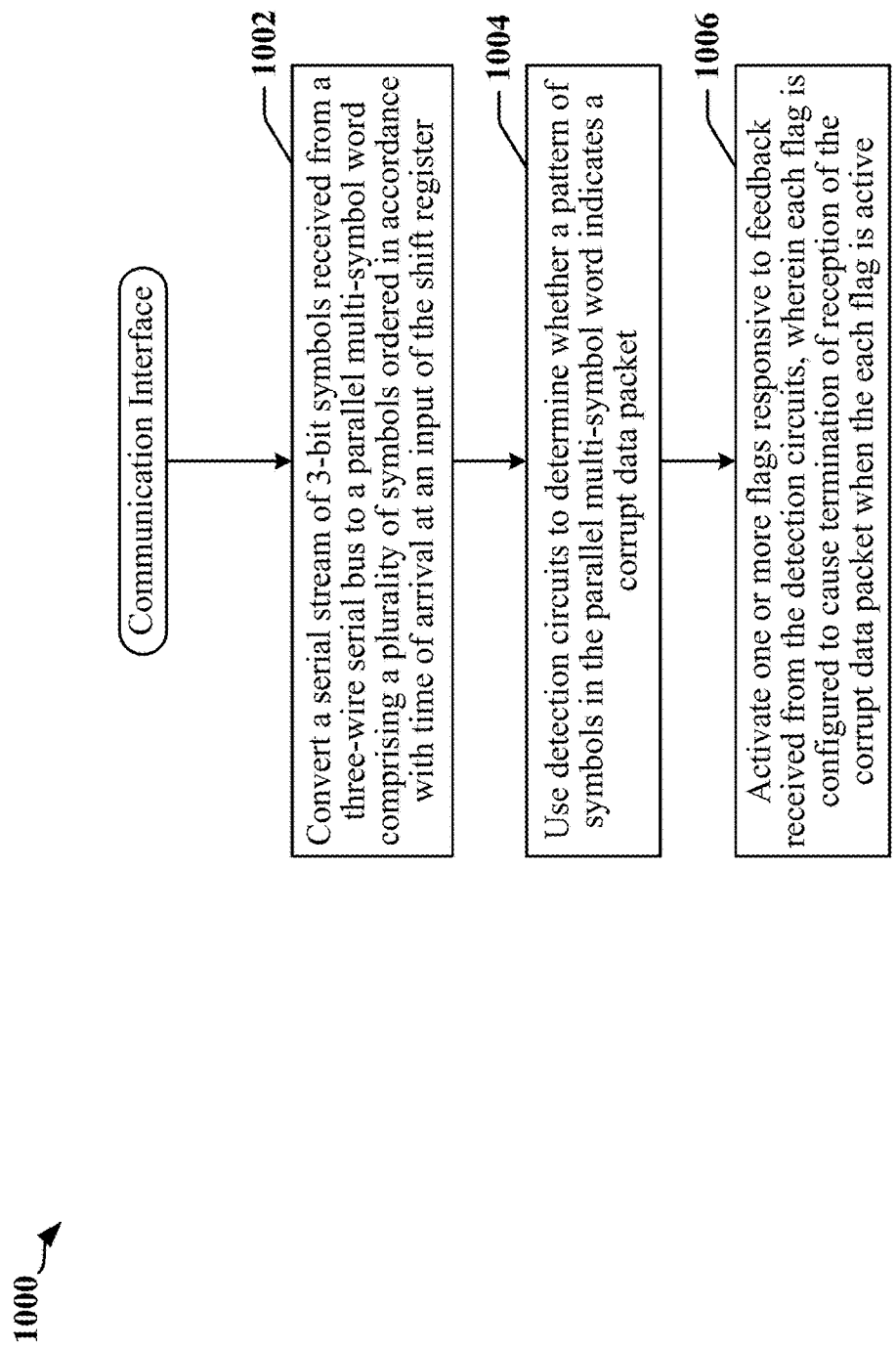
FIG. 10 is a flowchart that illustrates a method for operating a communication interface circuit in accordance with certain aspects disclosed herein.

FIG. 10 is a flowchart 1000 of a method for operating a communication interface circuit configured in accordance with certain aspects of this disclosure. In some instances, the method is implemented using one or more processors in a mobile communication device that includes a display or camera subsystem.

At block 1002 in the illustrated method, a serial stream of 3-bit symbols received from a three-wire serial bus is converted to a parallel multi-symbol word that includes a plurality of symbols ordered in accordance with time of arrival at an input of the deserializer. At block 1004 in the illustrated method, detection circuits are used to determine whether a pattern of symbols in the parallel multi-symbol word indicates a corrupt data packet. At block 1006 in the illustrated method, one or more flags are activated responsive to feedback received from the detection circuits. Each flag may correspond to a missing control sequence. Each flag may be configured to cause termination of reception of the corrupt data packet when the each flag is active. In some instances, the parallel multi-symbol word includes 14 symbols. The three-wire serial bus may be operated in accordance with a MIPI Alliance C-PHY protocol.

In one example, the detection circuits may be implemented using a plurality of symbol comparators. Each symbol comparator may be configured to determine whether a pattern of symbols in the parallel multi-symbol word corresponds to a control sequence configured in accordance with MIPI Alliance protocol.

In certain examples, each detection circuit is activated after a SoT sequence is detected on the three-wire serial bus. The detection circuits may include a preamble detector configured to assert a missing preamble flag when a preamble has not been detected within a first sampling window that begins after detection of the SoT sequence. The detection circuits may include a Sync detector configured to assert a missing Sync flag when a synchronization sequence has not been detected within a second sampling window that begins after detection of the SoT sequence. The detection circuits may include an EoT detector configured to assert a missing EoT flag when an EoT sequence has not been detected on the three-wire serial bus before a next SoT sequence is detected on the three-wire serial bus.

Figure 11:
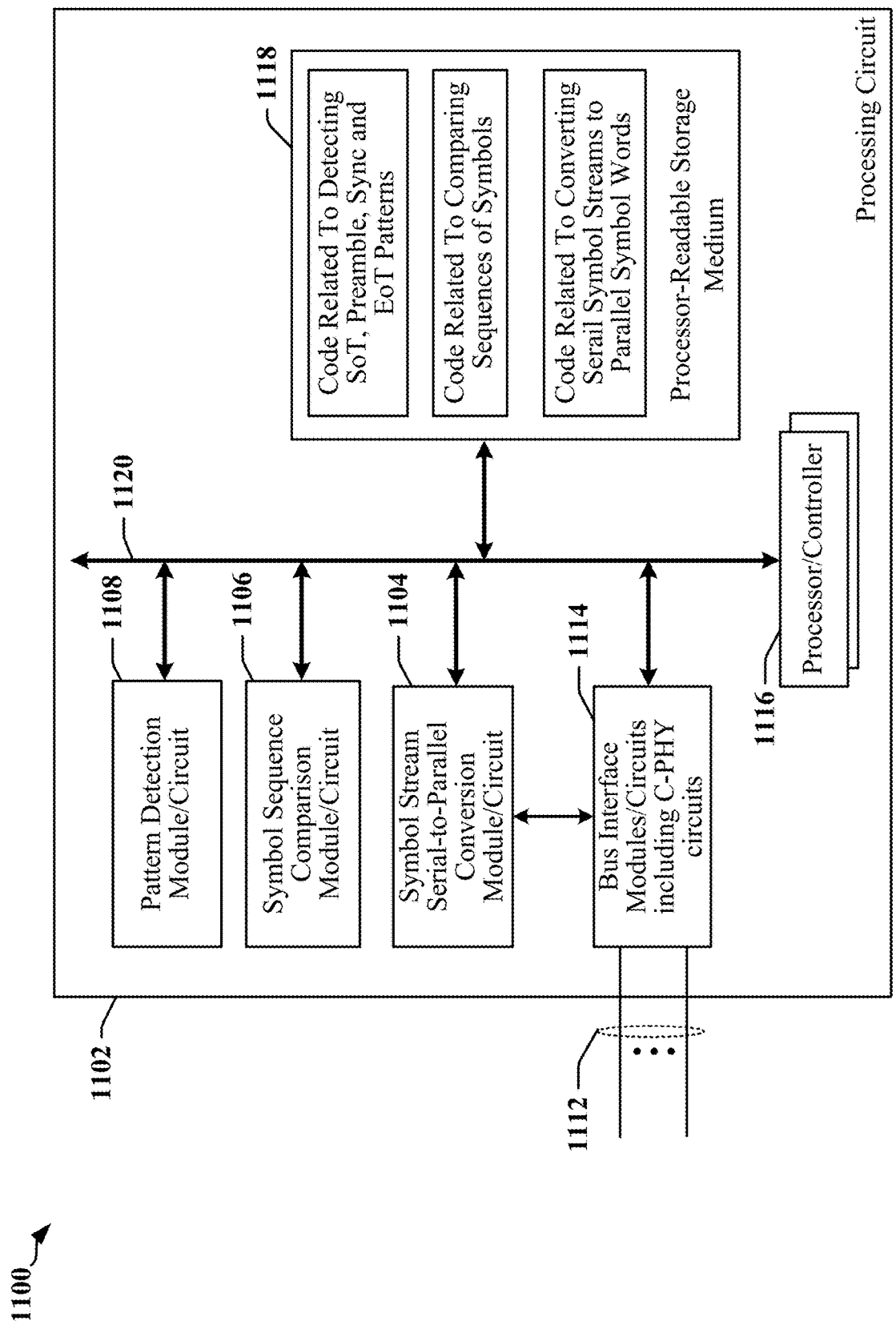
FIG. 11 illustrates a first example of a hardware implementation for a communication apparatus adapted in accordance with certain aspects disclosed herein.

FIG. 11 is a diagram illustrating a first example of a hardware implementation for an apparatus 1100 employing a processing circuit 1102. The processing circuit typically has one or more microprocessors, microcontrollers, digital signal processors, sequencers and/or state machines, represented generally by the processors 1116. The processing circuit 1102 may be implemented with a bus architecture, represented generally by the bus 1120. The bus 1120 may include any number of interconnecting buses and bridges depending on the specific application of the processing circuit 1102 and the overall design constraints. The bus 1120 links together various circuits including multiple processors 1116, the modules or circuits 1104, 1106 and 1108 and the processor-readable storage medium 1118. A bus interface circuit and/or module 1114 may be provided to support communications over multiple serial data links 1112. The bus 1120 may also link various other circuits such as timing sources, peripherals, voltage regulators, and power management circuits, which are well known in the art, and therefore, will not be described any further.

The processors 1116 may be responsible for general processing, including the execution of software, code and/or instructions stored on the processor-readable storage medium 1118. The processor-readable storage medium 1118 may include a non-transitory storage medium. The software, when executed by the processors 1116, causes the processing circuit 1102 to perform the various functions described supra for any particular apparatus. The processor-readable storage medium may be used for storing data that is manipulated by the processors 1116 when executing software. The processing circuit 1102 further includes at least one of the modules 1104, 1106 and 1108. The modules 1104, 1106 and 1108 may be software modules running in the processors 1116, resident/stored in the processor-readable storage medium 1118, one or more hardware modules coupled to the processors 1116, or some combination thereof. The modules 1104, 1106 and 1108 may include microcontroller instructions, state machine configuration parameters, or some combination thereof.

In one configuration, the apparatus 1100 includes modules and/or circuits 1104 adapted to convert streams of 3-bit symbols to parallel multibit words that represent a plurality of symbols, modules and/or circuits 1106 adapted to compare sequences of symbols, and modules and/or circuits 1108 adapted to detect SoT, Preamble, Sync and EoT patterns in a stream of symbols.

The apparatus 1100 may include means for converting a serial stream of 3-bit symbols received from a three-wire serial bus to a series of parallel multi-symbol words. Each multi-symbol word includes a plurality of symbols ordered in accordance with time of arrival at an input of a deserializer. The apparatus 1100 may include means for pattern matching configured to determine whether a pattern of symbols in the parallel multi-symbol word indicates a corrupt data packet, and means for activating one or more flags responsive to feedback received from the detection circuits. Each flag is configured to terminate reception of the corrupt data packet when the flag is active. The parallel multi-symbol word may include 14 symbols.

In some examples, the means for pattern is implemented using a plurality of symbol comparators. Each symbol comparator may be configured to determine whether a pattern of symbols in the parallel multi-symbol word corresponds to a control sequence configured in accordance with MIPI Alliance C-PHY protocol.

In certain examples, the means for pattern matching is activated after a SoT sequence is detected on the three-wire serial bus. The means for pattern matching may include a preamble detector configured to assert a missing preamble flag when a preamble has not been detected within a first sampling window that begins after detection of the SoT sequence. The means for pattern matching may include a Sync detector configured to assert a missing Sync flag when a synchronization sequence has not been detected within a second sampling window that begins after detection of the SoT sequence. The means for pattern matching may include an EoT detector configured to assert a missing EoT flag when an EoT sequence has not been detected on the three-wire serial bus before a next SoT sequence is detected on the three-wire serial bus.

The processor-readable storage medium 1118 may include instructions that cause the processing circuit 1102 to convert a serial stream of 3-bit symbols received from a three-wire serial bus to a parallel multi-symbol word that includes a plurality of symbols ordered in accordance with time of arrival at an input of a deserializer, use detection circuits to determine whether a pattern of symbols in the parallel multi-symbol word indicates a corrupt data packet, and activate one or more flags responsive to feedback received from the detection circuits. Each flag may be configured to cause termination of reception of the corrupt data packet when the each flag is active. The parallel multi-symbol word may include 14 symbols.

The detection circuits may include a plurality of symbol comparators, each symbol comparator being configured to determine whether a pattern of symbols in the parallel multi-symbol word corresponds to a control sequence configured in accordance with MIPI Alliance protocol.

In some examples, each detection circuit is activated after a start-of-transmission (SoT) sequence is detected on the three-wire serial bus. The detection circuits may include a preamble detector configured to assert a missing preamble flag when a preamble has not been detected within a first sampling window that begins after detection of the SoT sequence. The detection circuits may include a Sync detector configured to assert a missing Sync flag when a synchronization sequence has not been detected within a second sampling window that begins after detection of the SoT sequence. The detection circuits may include an EoT detector configured to assert a missing EoT flag when an EoT sequence has not been detected on the three-wire serial bus before a next SoT sequence is detected on the three-wire serial bus.

In one example, a communication interface circuit has a deserializer configured to convert a serial stream of 3-bit symbols received from a three-wire serial bus to a parallel multi-symbol word including a plurality of symbols ordered in accordance with time of arrival at an input of the deserializer, detection circuits configured to determine whether a pattern of symbols in the parallel multi-symbol word indicates a corrupt data packet, and a finite state machine configured to activate one or more flags responsive to feedback received from the detection circuits. Each flag may be configured to cause termination of reception of the corrupt data packet when active.

In some examples, the detection circuits include a plurality of symbol comparators. Each symbol comparator may be configured to determine whether a pattern of symbols in the parallel multi-symbol word corresponds to a control sequence configured in accordance with MIPI Alliance protocol.

In certain examples, each detection circuit is activated after a SoT sequence is detected on the three-wire serial bus. The detection circuits may include a preamble detector configured to assert a missing preamble flag when a preamble has not been detected within a first sampling window that begins after detection of the SoT sequence. The detection circuits may include a Sync detector configured to assert a missing Sync flag when a synchronization sequence has not been detected within a second sampling window that begins after detection of the SoT sequence. The detection circuits may include an EoT detector configured to assert a missing EoT flag when an EoT sequence has not been detected on the three-wire serial bus before a next SoT sequence is detected on the three-wire serial bus.

The parallel multi-symbol word includes 14 symbols. The three-wire serial bus may be operated in accordance with a MIPI Alliance C-PHY protocol.

Some implementation examples are described in the following numbered clauses:

1. A communication interface circuit, comprising: a deserializer configured to convert a serial stream of 3-bit symbols received from a three-wire serial bus to a parallel multi-symbol word comprising a plurality of symbols ordered in accordance with time of arrival at an input of the deserializer; detection circuits configured to determine whether a pattern of symbols in the parallel multi-symbol word indicates a corrupt data packet; and a finite state machine configured to activate one or more flags responsive to feedback received from the detection circuits, wherein each flag is configured to cause termination of reception of the corrupt data packet when the each flag is active.

2. The communication interface circuit as described in clause 1, wherein the detection circuits comprise a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol.

3. The communication interface circuit as described in clause 1 or clause 3, wherein each of the detection circuits is activated after a start-of-transmission (SoT) sequence is detected on the three-wire serial bus.

4. The communication interface circuit as described in clause 3, wherein the detection circuits comprise a preamble detector configured to assert a missing preamble flag when a preamble has not been detected within a first sampling window that begins after detection of the SoT sequence.

5. The communication interface circuit as described in clause 3 or clause 4, wherein the detection circuits comprise a synchronization (Sync) detector configured to assert a missing Sync flag when a synchronization sequence has not been detected within a second sampling window that begins after detection of the SoT sequence.

6. The communication interface circuit as described in any of clauses 3-5, wherein the detection circuits comprise an end-of-transmission (EoT) detector configured to assert a missing ET flag when an EoT sequence has not been detected on the three-wire serial bus before a next SoT sequence is detected on the three-wire serial bus.

7. The communication interface circuit as described in any of clauses 1-6, wherein the parallel multi-symbol word comprises 14 symbols.

8. The communication interface circuit as described in any of clauses 1-7, wherein the three-wire serial bus is operated in accordance with a MIPI Alliance C-PHY protocol.

9. A method for operating a communication interface circuit, comprising: converting a serial stream of 3-bit symbols received from a three-wire serial bus to a parallel multi-symbol word comprising a plurality of symbols ordered in accordance with time of arrival at an input of a deserializer; using detection circuits to determine whether a pattern of symbols in the parallel multi-symbol word indicates a corrupt data packet; and activating one or more flags responsive to feedback received from the detection circuits, wherein each flag is configured to cause termination of reception of the corrupt data packet when the each flag is active.

10. The method as described in clause 9, wherein the detection circuits comprise a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol.

11. The method as described in clause 9 or clause 10, wherein each of the detection circuits is activated after a start-of-transmission (SoT) sequence is detected on the three-wire serial bus.

12. The method as described in clause 11, wherein the detection circuits comprise a preamble detector configured to assert a missing preamble flag when a preamble has not been detected within a first sampling window that begins after detection of the SoT sequence.

13. The method as described in clause 11 or clause 12, wherein the detection circuits comprise a synchronization (Sync) detector configured to assert a missing Sync flag when a synchronization sequence has not been detected within a second sampling window that begins after detection of the SoT sequence.

14. The method as described in any of clauses 11-13, wherein the detection circuits comprise an end-of-transmission (EoT) detector configured to assert a missing EoT flag when an EoT sequence has not been detected on the three-wire serial bus before a next SoT sequence is detected on the three-wire serial bus.

15. The method as described in any of clauses 9-14, wherein the parallel multi-symbol word comprises 14 symbols.

16. The method as described in any of clauses 9-15, wherein the three-wire serial bus is operated in accordance with a MIPI Alliance C-PHY protocol.

17. An apparatus, comprising: means for converting a serial stream of 3-bit symbols received from a three-wire serial bus to a parallel multi-symbol word comprising a plurality of symbols ordered in accordance with time of arrival at an input of the deserializer; means for pattern matching configured to determine whether a pattern of symbols in the parallel multi-symbol word indicates a corrupt data packet; and means for activating one or more flags responsive to feedback received from the detection circuits, wherein each flag is configured to cause termination of reception of the corrupt data packet when the each flag is active.

18. The apparatus as described in clause 17, wherein the means for pattern matching comprises a plurality of symbol comparators, each symbol comparator being configured to determine whether a pattern of symbols in the parallel multi-symbol word corresponds to a control sequence configured in accordance with a Mobile Industry Processor Interface (MIPI) Alliance C-PHY protocol.

19. The apparatus as described in clause 17 or clause 18, wherein the means for pattern matching is activated after a start-of-transmission (SoT) sequence is detected on the three-wire serial bus.

20. The apparatus as described in clause 19, wherein the means for pattern matching comprises a preamble detector configured to assert a missing preamble flag when a preamble has not been detected within a first sampling window that begins after detection of the SoT sequence.

21. The apparatus as described in clause 19 or clause 20, wherein the means for pattern matching comprises a synchronization (Sync) detector configured to assert a missing Sync flag when a synchronization sequence has not been detected within a second sampling window that begins after detection of the SoT sequence.

22. The apparatus as described in any of clauses 19-21, wherein the means for pattern matching comprises an end-of-transmission (EoT) detector configured to assert a missing EoT flag when an EoT sequence has not been detected on the three-wire serial bus before a next SoT sequence is detected on the three-wire serial bus.

23. The apparatus as described in any of clauses 17-22, wherein the parallel multi-symbol word comprises 14 symbols.

24. A processor-readable storage medium comprising code configured to cause a processing circuit to: convert a serial stream of 3-bit symbols received from a three-wire serial bus to a parallel multi-symbol word comprising a plurality of symbols ordered in accordance with time of arrival at an input of the deserializer; use detection circuits to determine whether a pattern of symbols in the parallel multi-symbol word indicates a corrupt data packet; and activate one or more flags responsive to feedback received from the detection circuits, wherein each flag is configured to cause termination of reception of the corrupt data packet when the each flag is active.

25. The processor-readable storage medium as described in clause 24, wherein the detection circuits comprise a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol.

26. The processor-readable storage medium as described in clause 24 or clause 25, wherein each of the detection circuits is activated after a start-of-transmission (SoT) sequence is detected on the three-wire serial bus.

27. The processor-readable storage medium as described in clause 26, wherein the detection circuits comprise a preamble detector configured to assert a missing preamble flag when a preamble has not been detected within a first sampling window that begins after detection of the SoT sequence.

28. The processor-readable storage medium as described in clause 26 or clause 27, wherein the detection circuits comprise a synchronization (Sync) detector configured to assert a missing Sync flag when a synchronization sequence has not been detected within a second sampling window that begins after detection of the SoT sequence.

29. The processor-readable storage medium as described in any of clauses 26-28, wherein the detection circuits comprise an end-of-transmission (EoT) detector configured to assert a missing EoT flag when an EoT sequence has not been detected on the three-wire serial bus before a next SoT sequence is detected on the three-wire serial bus.

30. The processor-readable storage medium as described in any of clauses 24-29, wherein the parallel multi-symbol word comprises 14 symbols.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A communication interface circuit, comprising:
   a deserializer configured to convert a serial stream of 3-bit symbols received from a three-wire serial bus to a parallel multi-symbol word comprising a plurality of symbols ordered in accordance with time of arrival at an input of the deserializer;
   detection circuits configured to determine whether a pattern of symbols in the parallel multi-symbol word indicates a corrupt data packet; and
   a finite state machine configured to activate one or more flags responsive to feedback received from the detection circuits, wherein each flag is configured to cause termination of reception of the corrupt data packet when the each flag is active.

2. The communication interface circuit of claim 1, wherein the detection circuits comprise a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol.

3. The communication interface circuit of claim 1, wherein each of the detection circuits is activated after a start-of-transmission (SoT) sequence is detected on the three-wire serial bus.

4. The communication interface circuit of claim 3, wherein the detection circuits comprise a preamble detector configured to assert a missing preamble flag when a preamble has not been detected within a first sampling window that begins after detection of the SoT sequence.

5. The communication interface circuit of claim 3, wherein the detection circuits comprise a synchronization (Sync) detector configured to assert a missing Sync flag when a synchronization sequence has not been detected within a second sampling window that begins after detection of the SoT sequence.

6. The communication interface circuit of claim 3, wherein the detection circuits comprise an end-of-transmission (EoT) detector configured to assert a missing ET flag when an EoT sequence has not been detected on the three-wire serial bus before a next SoT sequence is detected on the three-wire serial bus.

7. The communication interface circuit of claim 1, wherein the parallel multi-symbol word comprises 14 symbols.

8. The communication interface circuit of claim 1, wherein the three-wire serial bus is operated in accordance with a MIPI Alliance C-PHY protocol.

9. A method for operating a communication interface circuit, comprising:
   converting a serial stream of 3-bit symbols received from a three-wire serial bus to a parallel multi-symbol word comprising a plurality of symbols ordered in accordance with time of arrival at an input of a deserializer;
   using detection circuits to determine whether a pattern of symbols in the parallel multi-symbol word indicates a corrupt data packet; and
   activating one or more flags responsive to feedback received from the detection circuits, wherein each flag is configured to cause termination of reception of the corrupt data packet when the each flag is active.

10. The method of claim 9, wherein the detection circuits comprise a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol.

11. The method of claim 9, wherein each of the detection circuits is activated after a start-of-transmission (SoT) sequence is detected on the three-wire serial bus.

12. The method of claim 11, wherein the detection circuits comprise a preamble detector configured to assert a missing preamble flag when a preamble has not been detected within a first sampling window that begins after detection of the SoT sequence.

13. The method of claim 11, wherein the detection circuits comprise a synchronization (Sync) detector configured to assert a missing Sync flag when a synchronization sequence has not been detected within a second sampling window that begins after detection of the SoT sequence.

14. The method of claim 11, wherein the detection circuits comprise an end-of-transmission (EoT) detector configured to assert a missing EoT flag when an EoT sequence has not been detected on the three-wire serial bus before a next SoT sequence is detected on the three-wire serial bus.

15. The method of claim 9, wherein the parallel multi-symbol word comprises 14 symbols.

16. The method of claim 9, wherein the three-wire serial bus is operated in accordance with a MIPI Alliance C-PHY protocol.

17. An apparatus, comprising:
   means for converting a serial stream of 3-bit symbols received from a three-wire serial bus to a parallel multi-symbol word comprising a plurality of symbols ordered in accordance with time of arrival at an input of a deserializer;
   means for pattern matching configured to determine whether a pattern of symbols in the parallel multi-symbol word indicates a corrupt data packet; and
   means for activating one or more flags responsive to feedback received from the means for pattern matching, wherein each flag is configured to cause termination of reception of the corrupt data packet when the each flag is active.

18. The apparatus of claim 17, wherein the means for pattern matching comprises a plurality of symbol comparators, each symbol comparator being configured to determine whether a pattern of symbols in the parallel multi-symbol word corresponds to a control sequence configured in accordance with a Mobile Industry Processor Interface (MIPI) Alliance C-PHY protocol.

19. The apparatus of claim 17, wherein the means for pattern matching is activated after a start-of-transmission (SoT) sequence is detected on the three-wire serial bus.

20. The apparatus of claim 19, wherein the means for pattern matching comprises a preamble detector configured to assert a missing preamble flag when a preamble has not been detected within a first sampling window that begins after detection of the SoT sequence.

21. The apparatus of claim 19, wherein the means for pattern matching comprises a synchronization (Sync) detector configured to assert a missing Sync flag when a synchronization sequence has not been detected within a second sampling window that begins after detection of the SoT sequence.

22. The apparatus of claim 19, wherein the means for pattern matching comprises an end-of-transmission (EoT) detector configured to assert a missing EoT flag when an EoT sequence has not been detected on the three-wire serial bus before a next SoT sequence is detected on the three-wire serial bus.

23. The apparatus of claim 17, wherein the parallel multi-symbol word comprises 14 symbols.

24. A non-transitory processor-readable storage medium comprising code configured to cause a processing circuit to:
   convert a serial stream of 3-bit symbols received from a three-wire serial bus to a parallel multi-symbol word comprising a plurality of symbols ordered in accordance with time of arrival at an input of a deserializer;
   use detection circuits to determine whether a pattern of symbols in the parallel multi-symbol word indicates a corrupt data packet; and
   activate one or more flags responsive to feedback received from the detection circuits, wherein each flag is configured to cause termination of reception of the corrupt data packet when the each flag is active.

25. The non-transitory processor-readable storage medium of claim 24, wherein the detection circuits comprise a plurality of symbol comparators, each symbol comparator being configured to determine whether a pattern of symbols in the parallel multi-symbol word corresponds to a control sequence configured in accordance with a Mobile Industry Processor Interface (MIPI) Alliance protocol.

26. The non-transitory processor-readable storage medium of claim 24, wherein each of the detection circuits is activated after a start-of-transmission (SoT) sequence is detected on the three-wire serial bus.

27. The non-transitory processor-readable storage medium of claim 26, wherein the detection circuits comprise a preamble detector configured to assert a missing preamble flag when a preamble has not been detected within a first sampling window that begins after detection of the SoT sequence.

28. The non-transitory processor-readable storage medium of claim 26, wherein the detection circuits comprise a synchronization (Sync) detector configured to assert a missing Sync flag when a synchronization sequence has not been detected within a second sampling window that begins after detection of the SoT sequence.

29. The non-transitory processor-readable storage medium of claim 26, wherein the detection circuits comprise an end-of-transmission (EoT) detector configured to assert a missing EoT flag when an EoT sequence has not been detected on the three-wire serial bus before a next SoT sequence is detected on the three-wire serial bus.

30. The non-transitory processor-readable storage medium of claim 24, wherein the parallel multi-symbol word comprises 14 symbols.

* * * * *